United States Patent [19]

Mookherjee et al.

[11] 3,928,645

[45] Dec. 23, 1975

[54] ENHANCING RED-BERRY FLAVOR WITH 4-(2,6,6-TRIMETHYL-1,3-CYCLOHEXADIEN-1-YL)-2-BUTANONE AND 4-(6,6-DIMETHYL-2-METHYLENE-3-CYCLOHEXEN-1-YL)-2-BUTANONE

[75] Inventors: Braja Dulal Mookherjee, Matawan; Robert Walter Trenkle, Bricktown; Manfred Hugo Vock, Locust, all of N.J.; Edward J. Shuster, Brooklyn, N.Y.

[73] Assignee: International Flavors & Fragrances Inc., New York, N.Y.

[22] Filed: Apr. 22, 1974

[21] Appl. No.: 462,748

Related U.S. Application Data

[63] Continuation-in-part of Ser. No. 386,320, Aug. 7, 1973, Pat. No. 3,872,031.

[52] U.S. Cl. ................. 426/538; 252/522; 131/17; 260/586 R
[51] Int. Cl.² .......................................... A23L 1/235
[58] Field of Search............ 260/586 R; 426/65, 538

[56] References Cited
UNITED STATES PATENTS
3,436,421   1/1969   Rowland.............................. 260/587

OTHER PUBLICATIONS
Fenaroli's Handbook of Flavor Ingredients, 1971, Edited by Furia et al., Chemical Rubber Co.: Cleveland, pp. 166–167.
"Chemicals Used in Food Processing," 1965, Publication 1274, National Academy of Sciences–National Research Council, Wash., D.C.
Fenaroli's Handbook of Flavor Ingredients, 1971, edited by Furia et al., Chemical Rubber Co.: Cleveland, pp. 442, 666–670.
Kruk and De Boer *Recueil*, Vol. 87 (1968), pp. 641–654.

*Primary Examiner*—Joseph M. Golian
*Attorney, Agent, or Firm*—Arthur L. Liberman, Esq.; Harold Haidt, Esq.

[57] ABSTRACT

Methods for preparing foodstuffs, flavoring compositions for foodstuffs, tobacco compositions, flavoring compositions for tobacco, perfume compositions and ingredients for perfume compositions by including therein 4-(2,6,6-trimethyl-1,3-cyclohexadien-1-yl)-2-butanone or 4-(6,6-dimethyl-2-methylene-3-cyclohexen-1-yl)-2-butanone to produce:

a. In food flavorings, raspberry, waxey, tobacco, rosey, ionone flavor notes or combinations of these and woody, tobacco, floral aroma notes for improving the taste and aroma of artificial strawberry, or other red berry (e.g., raspberry) flavoring compositions;

b. In perfumes, a sweet, fruity, woody, berry "mimosa" character as well as the foodstuff flavoring compositions and perfume compositions containing 4-(2,6,6-trimethyl-1,3-cyclohexadien-1-yl)-2-butanone and/or 4-(6,6-dimethyl-2-methylene-3-cyclohex-1-yl)-2-butanone; and c. In tobaccos, natural, sweet, oily notes.

1 Claim, No Drawings

ENHANCING RED-BERRY FLAVOR WITH 4-(2,6,6-TRIMETHYL-1,3-CYCLOHEXADIEN-1-YL)-2-BUTANONE AND 4-(6,6-DIMETHYL-2-METHYLENE-3-CYCLOHEXEN-1-YL)-2-BUTANONE

This application is a continuation-in-part of application for U.S. Ser. No. 386,320 filed on Aug. 7, 1973, now U.S. Pat. No. 3,872,031, granted Mar. 18, 1975.

BACKGROUND OF THE INVENTION

The present invention relates to novel methods and compositions using 4-(2,6,6-trimethyl-1,3-cyclohexadien-1-yl)-2-butanone and/or 4-(6,6-dimethyl-2-methylene-3-cyclohexen-1-yl)-2-butanone to alter the flavor and/or aroma of consumable materials.

There has been considerable work performed relating to substances which can be used to impart (or enhance) flavors to (or in) various consumable materials. These substances are used to diminish natural materials some of which may be in short supply and to provide more uniform properties in finished products. Raspberry, waxey, tobacco, rosey, ionone flavor notes and woody, tobacco, floral aroma notes are particularly desirable for many uses in fruit flavoring compositions and consumable articles, e.g., foodstuffs. Sweet, fruity, woody, berry "mimosa" aromas are particularly desirable in perfume compositions. Sweet, natural tobacco notes are desirable in tobacco compositions.

The flavor and fragrance material having the structure:

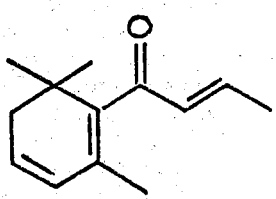

is disclosed in British Pat. No. 1,305,621 issued on Feb. 7, 1973.

4-(2,6,6-trimethyl-1,3-cyclohexadien-1-yl)-2-butanone, having the structure:

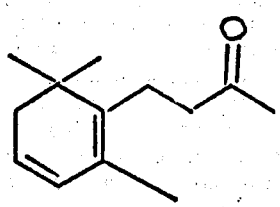

may be synthesized according to the technique of Wolf and Zink, Volume 56, Helevetica Chimica Acta., Fasc 3 (1973) pp. 1062–1066, or according to Examples I and II of Rowland, U.S. Pat. No. 3,436,421 issued on April 1, 1969 by means of bromination of α-dihydroionone followed by debromination. 4-(6,6-dimethyl-2-methylene-3-cyclohexen-1-yl)-2-butanone having the structure:

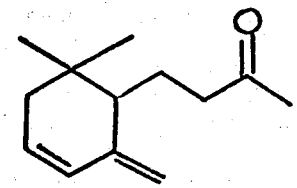

is also produced in this process as a bi-product thereof (B.P. 65°C at 0.15 mm Hg. pressure). 4-(2,6,6-trimethyl-1,3-cyclohexadien-1-yl)-2-butanone is also shown to be a bi-product in the cyclization of α-ionone to beta ionone by Kruk and De Boer in Volume 87 Recucil (1968) pp. 641–654 as an intermediate in preparing other perfumery compounds. The compound having the structure:

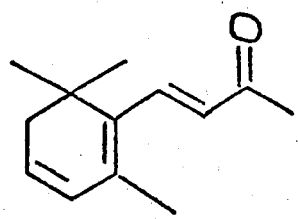

is disclosed in Japanese Pat. No. 7121,015 (Sakan and Isoe) issued June 14, 1971.

THE INVENTION

It has now been discovered that novel solid and liquid foodstuff and food flavoring compositions having raspberry, waxey, tobacco, rosey, ionone flavor notes and woody, tobacco, floral aroma notes reminiscent of red-berry-like flavors; novel tobacco compositions having imparted thereto sweet natural tobacco notes and novel aroma imparting compositions having fruity, woody, berry "mimosa" characteristics may be provided by the utilization of 4-(2,6,6-trimethyl-1,3-cyclohexadien-1-yl)-2-butanone and/or 4-(6,6-dimethyl-2-methylene-3-cyclohexen-1-yl)-2-butanone having the generic structure:

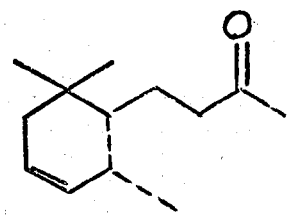

wherein one of the dashed lines represents a carbon-carbon double bond, and the other dashed line represents a carbon-carbon single bond. Thus, the 4-(2,6,6-trimethyl-1,3-cyclohexadien-1-yl)-2-butanone and/or 4-(6,6-dimethyl-2-methylene-3-cyclohexen-1-yl)-2-butanone of our invention are capable of supplying and/or potentiating certain flavor and aroma notes usually lacking in many red-berry type flavors as well as notes usually lacking in many perfumery materials, e.g., "mimosa" aromas, and in many tobaccos, e.g., sweet, natural tobacco notes.

When the 2,6,6-(2,6,6-trimethyl-1,3-cyclohexadien-1-yl)-2-butanone and/or 4-(6,6-dimethyl-2-methylene-3-cyclohex-1-yl)-2-butanone of our invention is used as a food flavor adjuvant, the nature of the co-ingredients included with the said 4-(2,6,6.-trimethyl-1,3-cyclohexadien-1-yl)-2-butanone and/or 4-(6,6-dimethyl-2-methylene-3-cyclohexen-1-yl)-2-butanone in formulating the product composition will also serve to alter the organoleptic characteristics of the ultimate foodstuffs treated therewith. As used herein in regard to flavors, the term "alter" in its various forms means "supplying or imparting flavor character or note to otherwise bland, relatively tasteless substance or augmenting the existing flavor characteristic where a natural flavor is deficient in some regard or supplementing the existing flavor impression to modify its quality, character or taste". As used herein, the term "foodstuff" includes both solid and liquid ingestible materials which usually do but need not have nutritional value. Thus, foodstuffs include meats, gravies, soups, convenience foods, beverages, dairy products, candies, vegetables, cereals, soft drinks, snacks and the like.

Substances suitable for use herein as co-ingredients or flavoring adjuvants are well known in the art for such use being extensively described in the relevant literature. Apart from the requirement that any such material be "ingestibly" acceptable and thus non-toxic or otherwise non-deleterious nothing particularly critical resides in selection thereof. Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, and sequestrants, e.g., citric acid.

Thickener compounds include carriers, binders, protective colloids, suspending agents, emulsifiers and the like, e.g., agaragar; carrageenan; cellulose and cellulose derivatives such as carboxymethyl cellulose and methyl cellulose; natural and synthetic gums such as gum arabic, gum tragacanth; gelatine, proteinaceous materials; lipids; carbohydrates; starches pectins, and emulsifiers, e.g., mono-and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono-and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like, colorants, e.g., carminic acid, cochineal, turmeric and curcumin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acid, e.g., fatty saturated acids, unsaturated acids and amino acids; alcohols, e.g., primary and secondary alcohols; esters; carbonyl compounds, e.g., aldehydes and ketones as well as lactones; cyclic organic materials including benzene derivatives; isocyclics, heterocyclics such as furans particularly 2,5-dimethyl-3-acetyl furan and 2-methyl-2,3-dihydro furan-3-one, pyridines, pyrazines (particularly mono-alkyl, dialkyl, trialkyl and tetra-alkyl substituted pyrazines) and the like, sulfur-containing materials including thiazoles, disulfides, thiols, sulfides, aldehydes, (for example, 3-phenyl-4-pentenal, 3-phenyl-3-pentenal, 3-phenyl-2-pentenal, 2-phenyl-2-pentenal and 2-phenyl-3-methyl-2-butenal); disulfides and the like; other flavor potentiators such as monosodium glutamate, guanylates, inosinates, natural and synthetic flavorants, such as vanillin, ethyl vanillin, diacetyl, phenethyl-2-furoate, maoltol, natural gums and the like; spices, herbs, essential oils and extractives including "bitterness principles" such as theobromin, caffein, naringin and other suitable materials creating a bitter effect.

The specific flavoring adjuvant selected for use may be either solid or liquid depending upon the desired physical form of the ultimate product, i.e., foodstuff, whether simulated or natural, and should, in any event, be capable of providing an environment in which the 4-(2,6,6-trimethyl-1,3-cyclohexadien-1-yl)-2-butanone and/or 4-(6,6-dimethyl-2-methylene-3-cyclohexen-1-yl)-2-butanone can be dispersed or admixed to provide a homogeneous medium. In addition, selection of one or more flavoring adjuvants as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 4-(2,6,6-trimethyl-1,3-cyclohexadien-1-yl)-2-butanone and/or 4-(6,6-dimethyl-2-methylene-3-cyclohexen-1-yl)-2-butanone employed in a particular instance can vary over a relatively wide range whereby to its desired organoleptic effects having reference to the nature of the product are achieved. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing the composition merely deficient in natural flavor or aroma. Thus, the primary requirement is that the amount selected to be effective, i.e., sufficient to alter the organoleptic characteristics of the parent composition, whether foodstuff per se or flavoring composition. Thus, the use of insufficient quantities of 4-(2,6,6-trimethyl-1,3-cyclohexadien-1-yl)-2-butanone and/or 4-(6,6-dimethyl-2-methylene-3-cyclohexen-1-yl)-2-butanone will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus and with respect to ultimate food compositions, it has been found that quantities of 4-(2,6,6-trimethyl-1,3-cyclohexadien-1-yl)-2-butanone and/or 4-(6,6-dimethyl-2-methylene-3-cyclohex-1-yl)-2-butanone ranging from a small but effective amount, e.g., 0.02 parts per million up to about 50 parts per million by weight based on total composition are suitable. Concentrations in excess of the maximum quantity stated are not normally recommended since they fail to provide commensurate enhancement of organoleptic properties. In those cases wherein the 4-(2,6,6-trimethyl-1,3-cyclohexadien-1-yl)-2-butanone and/or 4-(6,6-dimethyl-2-methylene-3-cyclohexen-1-yl)-2-butanone is added to the foodstuff as an integral component of the flavoring composition, it is, of course, essential that the total quantity of flavoring composition employed be sufficient to yield an effective 4-(2,6,6-trimethyl-1,3-cyclohexadien-1-yl)-2-butanone and/or 4-(6,6-dimethyl-2-methylene-3-cyclohexen-1-yl)-2-butanone concentration in the foodstuff product.

Food flavoring compositions prepared in accordance with the present invention preferably contain 4-(2,6,6-trimethyl-1,3-cyclohexadien-1-yl)-2-butanone and/or 4-(6,6-dimethyl-2-methylene-3 -cyclohexen-1-yl)-2-butanone in concentrations ranging from about 0.2% up to about 10% by weight based on a total weight of said flavoring composition.

The compositions described herein can be prepared according to conventional techniques well known as typified by cake batters and vegetable juices and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 4-(2,6,6-trimethyl-1,3-cyclohexadien-1-yl)-2-butanone and/or 4-(6,6-dimethyl-2-methylene-3-cyclohexen-1-yl)-2-butanone with for example gum arabic, gum tragacanth, carrageenan and the like and thereafter spray-drying the resultant mixture whereby to obtain the particular solid product. Pre-prepared flavor mixed in powder form, e.g., a red currant mix or a fruit flavored powder obtained by mixing dried solid components, e.g., starch, sugar and the like and 4-(2,6,6-trimethyl-1,3-cyclohexadien-1-yl)-2-butanone and/or 4-(6,6-dimethyl-2-methylene-3-cyclohexen-1-yl)-2-butanone in a dry blender until the requisite degree of uniformity is achieved.

It is presently preferred to combine the 4-(2,6,6-trimethyl-1,3-cyclohexadien-1-yl)-2-butanone and/or 4-(6,6-dimethyl-2-methylene-3-cyclohexen-1-yl)-2-butanone with the following adjuvants:

Vanillin
Allyl Caproate
Citral
Amyl Butyrate
Ethyl Butyrate
Ethyl Acetate
Amyl Acetate
Cinnamyl Aldehyde
Maltol
Acetic Acid
Ethyl Methyl Phenyl Glycidate
Benzyl Acetate
Methyl Cinnamate
Methyl Anthranilate
Methyl Heptinyl Carbonate
Methyl Salicylate
Beta Ionone
Gamma Undecalactone
Diacetyl
Anethol 4-(2,6,6-trimethyl-1,3-cyclohexadien-1-yl)-2-butanone and/or 4-(6,6-dimethyl-2-methylene-3-cyclohexen-1-yl)-2-butanone and an auxiliary perfume ingredient including, for example, alcohols, aldehydes, nitriles, esters, cyclic esters and natural essential oils may be admixed so that the combined odors of the individual components produce a pleasant or desired fragrance. Such perfume compositions usually contain (a) the main note or the "bouquet" or foundation stone of the combination; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions, the individual component will contribute its particular olfactory characteristics but the over-all effect of the perfume composition will be the sum of the effects of each of the ingredients. Thus, 4-(2,6,6-trimethyl-1,3-cyclohexadien-1-yl)-2-butanone and/or 4-(6,6-dimethyl-2-methylene-3-cyclohexen-1-yl)-2-butanone can be used to alter the aroma characteristics of a perfume composition, for example, by utilizing or moderating the olfactory reaction contributed by another ingredient in the composition.

The amount of the 4-(2,6,6-trimethyl-1,3-cyclohexadien-1-yl)-2-butanone and/or 4-(6,6-dimethyl-2-methylene-3-cyclohexen-1-yl)-2-butanone of our invention which will be effective in perfume compositions depend on many factors including the other ingredients, their amounts and the effects which are desired. It has been found that perfume compositions containing as little as 0.05% of 4-(2,6,6-trimethyl-1,3-cyclohexadien-1-yl)-2-butanone and/or 4-(6,6-dimethyl-2-methylene-3-cyclohexen-1-yl)-2-butanone or even less can be used to impart a "mimosa" type scent odor to soaps, cosmetics and other products. The amount employed can range up to 5% of the fragrance components and will depend on considerations of cost, nature of the end product, the effect desired on the finished product and the particular fragrance sought.

4-(2,6,6-trimethyl-1,3-cyclohexadien-1-yl)-2-butanone and/or 4-(6,6-dimethyl-2-methylene-3-cyclohexen-1-yl)-2-butanone are useful in perfume compositions as olfactory components in detergents and soaps; space odorants and deodorants; perfumes; colognes; toilet water; bath preparations such as bath oils and bath solids; hair preparations as lacquers, brilliantines, pomades and shampoo; cosmetic preparations such as creams, deodorants, hand lotions and sunscreens; powders such as talcs, dusting powders, face powders and the like. When used as an olfactory component of a perfumed article as little as 100 parts per million of the 4-(2,6,6-trimethyl-1,3-cyclohexadien-1-yl)-2-butanone and/or 4-(6,6-dimethyl-2-methylene-3-cyclohexen-1-yl)-2-butanone will suffice to impart a low keyed "mimosa" character which is one of the key odor characteristics of "mimosa" perfume formulations. Generally, no more than 0.5% of 4-(2,6,6-trimethyl-1,3-cyclohexadien-1-yl)-2-butanone and/or 4-(6,6-dimethyl-2-methylene-3-cyclohexen-1-yl)-2-butanone based on the ultimate end product is required in the perfume composition.

In addition, the perfume composition or fragrance composition of this invention contain a vehicle or carrier for the 4-(2,6,6-trimethyl-1,3-cyclohexadien-1-yl)-2-butanone and/or 4-(6,6-dimethyl-2-methylene-3-cyclohexen-1-yl)-2-butanone. The vehicle can be a liquid such as an alcohol, a non-toxic alcohol, a non-toxic glycol or the like. The carrier can also be an absorbent solid such as a gum (e.g., gum arabic) or components for encapsulating the composition (such as gelatine).

An additional aspect of our invention provides an organoleptically improved smoking tobacco product and additives therefor, as well as methods of making the same which overcome the problems heretofore encountered and in which specific desired natural and/or sweet flavoring characteristics of tabacco are created or enhanced and may be readily controlled and maintained at the desired uniform level regardless of variations in the tobacco components of the blend.

This invention further provides improved tobacco additives and methods whereby various desirable natural and/or sweet flavoring characteristics may be imparted to smoking tobacco products and may be readily varied and controlled to produce the desired uniform flavoring characteristics.

In carrying out this aspect of our invention we add to smoking tobacco materials or a suitable substitute therefor (e.g., dried lettuce leaves) an aroma and flavor additive containing as an active ingredient one or both of the following materials:

4-(2,6,6-trimethyl-1,3-cyclohexadien-1-yl)-2-butanone and/or 4-(6,6-dimethyl-2-methylene-3-cyclohexen-1-yl)-2-butanone In addition to the 4-(2,6,6-trimethyl-1,3-cyclohexadien-1-yl)-2-butanone and/or 4-(6,6-dimethyl-2-methylene-3-cyclohexen-1-yl)-2-butanone of our invention other flavoring and aroma additives may be added to the smoking tobacco material or substitute therefor either separately or in mixture with the 4-(2,6,6-trimethyl-1,3-cyclohexadien-1-yl)-2-butanone and/or 4-(6,6-dimethyl-2-methylene-3-cyclohexen-1-yl)-2-butanone as follows:

| I. | Synthetic Materials |
| --- | --- |
| | Beta-Ethyl-Cinnamaldehyde |
| | Eugenol |
| | Dipentene |
| | Maltol |
| | Ethyl Maltol |
| | Delta Undecalactone |
| | Delta Decalactone |
| | Benzaldehyde |
| | Amyl Acetate |
| | Ethyl Butyrate |
| | Ethyl Valerate |
| | Ethyl Acetate |
| | 2-Hexenol-1,2-methyl-5-isopropyl-1,3-nonadiene-8-one |
| | 2,6-Dimethyl-2,6-undecadiene-10-one |
| | 2-Methyl-5-isopropyl acetophenone |
| | 2-Hydroxy-2,5,5,8a-tetramethyl-1-(2-hydroxyethyl)-decahydronaphthalene |
| | Dodecahydro-3a-6,6,9a-tetramethyl naphtho-(2,1-b)-furan |
| | 4-Hydroxy hexanoic acid, gamma lactone |

| | -continued |
| --- | --- |
| I. | Synthetic Materials |
| | Polyisoprenoid hydrocarbons defined in Example V of U.S. Patent 3,589,372 issued on June 29, 1971 |
| II. | Natural Oils |
| | Celery seed oil |
| | Coffee Extract |
| | Bergamot Oil |
| | Cocoa Extract |
| | Nutmeg Oil |
| | Origanum Oil |

An aroma and flavoring concentrate containing 4-(2,6,6-trimethyl-1,3-cyclohexadien-1-yl)-2-butanone and/or 4-(6,6-dimethyl-2-methylene-3-cyclohexen-1-yl)-2-butanone and, if desired, one or more of the above indicated additional flavoring additives may be added to the smoking tobacco material, to the filter or to the leaf or paper wrapper. The smoking tobacco material may be shredded, cured, cased and blended tobacco material or reconstituted tobacco material or tobacco substitutes (e.g., lettuce leaves) or mixtures thereof. The proportions of flavoring additives may be varied in accordance with taste but insofar as enhancement or the imparting of natural and/or sweet notes, we have found that satisfactory results are obtained if the proportion by weight of the sum total of 4-(2,6,6-trimethyl-1,3-cyclohexadien-1-yl)-2-butanone and/or 4-(6,6-dimethyl-2-methylene-3-cyclohexen-1-yl)-2-butanone to smoking tobacco material is between 10 ppm and 50 ppm (0.001%–0.005%) of the active ingredients to the smoking tobacco material. We have further found that satisfactory results are obtained if the proportion by weight of the sum total of 4-(2,6,6-trimethyl-1,3-cyclohexadien-1-yl)-2-butanone and/or 4-(6,6-dimethyl-2-methylene-3-cyclohexen-1-yl)-2-butanone used to flavoring material is between 1% and 10%.

Any convenient method for incorporating the 4-(2,6,6-trimethyl-1,3-cyclohexadien-1-yl)-2-butanone and/or 4-(6,6-dimethyl-2-methylene-3-cyclohexen-1-yl)-2-butanone in the tobacco product may be employed. Thus, the 4-(2,6,6-trimethyl-1,3-cyclohexadien-1-yl)-2-butanone and/or 4-(6,6-dimethyl-2-methylene-3-cyclohexen-1-yl)-2-butanone taken alone or along with other flavoring additives may be dissolved in a suitable solvent such as ethanol, pentane, diethyl ether and/or other volatile organic solvents and the resulting solution may either be spread on the cured, cased and blended tobacco material or the tobacco material may be dipped into such solution. Under certain circumstances, a solution of the 4-(2,6,6-trimethyl-1,3-cyclohexadien-1-yl)-2-butanone and/or 4-(6,6-dimethyl-2-methylene-3-cyclohexen-1-yl)-2-butanone taken alone or taken further together with other flavoring additives as set forth above, may be applied by means of a suitable applicator such as a brush or roller on the paper or leaf wrapper for the smoking product, or it may be applied to the filter by either spraying, or dipping or coating.

Furthermore, it will be apparent that only a portion of the tobacco or substitute therefor need be treated and the thus treated tobacco may be blended with other tobaccos before the ultimate tobacco product is formed. In such cases, the tobacco treated may have the 4-(2,6,6-trimethyl-1,3-cyclohexadien-1-yl)-2-butanone and/or 4-(6,6-dimethyl-2-methylene-3-cyclohexen-1-yl)-2-butanone in excess of the amounts or concentrations above indicated so that when blended with other tobaccos, the final product will have the percentage within the indicated range.

In accordance with one specific example of our invention an aged, cured and shredded domestic burley tobacco is spread with a 20% ethyl alcohol solution of a mixture of 4-(2,6,6-trimethyl-1,3-cyclohexadien-1-yl)-2-butanone and/or 4-(6,6-dimethyl-2-methylene-3-cyclohexen-1-yl)-2-butanone in an amount to provide a tobacco composition containing 20 ppm by weight of 4-(2,6,6-trimethyl-1,3-cyclohexadien-1-yl)-2-butanone and/or 4-(6,6-dimethyl-2-methylene-3-cyclohexen-1-yl)-2-butanone on a dry basis. Thereafter, the alcohol is removed by evaporation and the tobacco is manufactured into cigarettes by the usual techniques. The cigarette when treated as indicated has a desired and pleasing aroma which is detectable in the main and side smoke streams when the cigarette is smoked. This aroma is described as a "sweet natural tobacco aroma."

While our invention is particularly useful in the manufacture of smoking tobacco, such as cigarette tobacco, cigar tobacco and pipe tobacco, other tobacco products formed from sheeted tobacco dust or fines may also be used. Likewise, the 4-(2,6,6-trimethyl-1,3-cyclohexadien-1-yl)-2-butanone and/or 4-(6,6-dimethyl-2-methylene-3-cyclohexen-1-yl)-2-butanone of our invention can be incorporated with materials such as filter tip materials, seam paste, packaging materials and the like which are used along with tobacco to form a product adapted for smoking. Furthermore, the 4-(2,6,6-trimethyl-1,3-cyclohexadien-1-yl)-2-butanone and/or 4-(6,6-dimethyl-2-methylene-3-cyclohexen-1-yl)-2-butanone can be added to certain tobacco substitutes of natural or synthetic origin (e.g., dried lettuce leaves) and, accordingly, by the term "tobacco" as used throughout this specification is meant any composition intended for human consumption by smoking or otherwise, whether composed of tobacco plant parts or substitute materials or both.

It will thus be apparent that 4-(2,6,6-trimethyl-1,3-cyclohexadien-1-yl)-2-butanone and/or 4-(6,6-dimethyl-2-methylene-3-cyclohexen-1-yl)-2-butanone can be utilized to alter the sensory properties, particularly organoleptic properties such as flavor and/or fragrances of a wide variety of consumable materials.

The following examples are given to illustrate embodiments of our invention as it is presently preferred to practice it. It will be understood that these examples are illustrative and the invention is not to be considered as restricted thereto except as indicated in the appended claims.

EXAMPLE I

Perfume Formulation

The following mixture is prepared:

| Ingredients | Parts by Weight |
|---|---|
| Methyl Acetophenone | 4 |
| Terpineol | 450 |
| Phenyl Ethyl Alcohol | 50 |
| Bergamot Oil | 20 |
| Methyl Heptinyl Carbonate | 1 |
| 4-(2,6,6-trimethyl-1,3-cyclohexadien-1-yl)-2-butanone | 20 |
| Heliotropin | 30 |
| Anisic Aldehyde | 180 |
| Methyl Anthranilate | 5 |
| Jasmine Absolute | 30 |
| Cinnamic Alcohol | 100 |
| Cassie Absolute | 10 |
| Hydroxycitronellal | 100 |

The 4-(2,6,6-trimethyl-1,3-cyclohexadien-1-yl)-2-butanone imparts to this formulation a low keyed "mimosa" character which is one of the key odor characteristics of this type of aroma.

EXAMPLE II

Preparation of Soap Composition

One hundred grams of soap chips are mixed with one gram of the perfume composition of Example I until a substantially homogeneous composition is obtained. The perfumed soap composition exhibits a "mimosa" characteristic.

EXAMPLE III

Preparation of a Detergent Composition

A total of 100 grams of a detergent powder is mixed with 0.15 grams of the perfume composition of Example I until a substantially homogeneous composition is prepared. This composition exhibits a "mimosa" fragrance.

EXAMPLE IV

Preparation of a Cosmetic Powder Composition

A cosmetic powder is prepared by mixing in a ball mill, 100 grams of talcum powder with 0.25 grams of 4-(2,6,6-trimethyl-1,3-cyclohexadien-1-yl)-2-butanone. It has an excellent "mimosa" aroma.

EXAMPLE V

Perfumed Liquid Detergent

Concentrated liquid detergent with a rich "mimosa" character are obtained containing 0.10%, 0.15%, and 0.20% of 4-(2,6,6-trimethyl-1,3-cyclohexadien-1-yl)-2-butanone. They are prepared by adding and homogeneously mixing the appropriate quantity of 4-(2,6,6-trimethyl-1,3-cyclohexadien-1-yl)-2-butanone in the liquid detergent. The detergents all possess a "mimosa" fragrance, the intensity increasing with greater concentrations of 4-(2,6,6-trimethyl-1,3-cyclohexadien-1-yl)-2-butanone.

EXAMPLE VI

Cologne 4-(2,6,6-trimethyl-1,3-cyclohexadien-1-yl)-2-butanone is incorporated in a cologne at a concentration of 2.5% in 85% aqueous ethanol; and into a handkerchief perfume at a concentration of 5% (in 95% aqueous ethanol). A distinct and definite "mimosa" fragrance is imparted to the cologne and to the handkerchief perfume.

EXAMPLE VII

The composition of Example I is incorporated in a cologne at a concentration of 2.5% in 85% aqueous ethanol; and into a handkerchief perfume at a concentration of 20% (in 95% aqueous ethanol). The composition of Example I affords a distinct and definite strong "mimosa" fragrance to that handkerchief perfume and cologne.

EXAMPLE VIII

Flavor Formulations

The following mixture is prepared:

| Ingredients | Parts by Weight |
| --- | --- |
| Vanillin | 20 |
| Allyl Caproate | 10 |
| Citral | 20 |
| Amyl Butyrate | 35 |
| Orange Oil | 45 |
| Ethyl Butyrate | 75 |
| Ethyl Acetate | 185 |
| Amyl Acetate | 185 |
| Lemon Oil | 400 |

4-(2,6,6-trimethyl-1,3-cyclohexadien-1-yl)-2-butanone was added to 975 grams of the above mixture which was then called "Test Composition". A control composition was prepared by adding 25 grams of additional lemon oil to 975 grams of the above mixture.

The test and control compositions were added to the food products described hereinafter and the proportions shown for 100 kilograms of material to be flavored:

| | |
| --- | --- |
| Cake | 20 grams |
| Pudding | 5–10 grams |
| Cooked sugar | 15–20 grams |

Cooked sugar — 100 ml of sugar syrup (prepared by dissolving 1 kilogram of sucrose in 600 ml of water) and 20 grams of glucose were mixed together and slowly heated to 145°C. The flavor was added and the mass allowed to cool and harden.

Pudding — To 500 ml of warmed milk were added with stirring a mixture of 60 grams sucrose and 3 grams of pectin. The mixture was boiled for a few seconds and the flavor was added. The mixture was allowed to cool.

Cake — The following ingredients were mixed together:

| | |
| --- | --- |
| Vegetable Margarin | 100 grams |
| Sodium Chloride | 1.5 grams |
| Sucrose | 100 grams |
| Eggs | 2 |
| Flour | 100 grams |

The flavor was added and the mass was cooked for 40 minutes at 180°C. The finished foodstuff samples were tested by a panel of trained persons who had to express their views about the flavor of the samples. All members of the panel declared with no hesitation that the test samples had a more distinguished fruity and woody note than the control samples and at the same time a red-berry character.

EXAMPLE IX

Strawberry Flavor Formulation

The following mixture is prepared:

| Ingredients | Parts by Weight |
| --- | --- |
| Maltol | 1.5 |
| Glacial Acetic Acid | 1.0 |
| Ethyl Methyl Phenyl Glycidate | 3.0 |
| Benzyl Acetate | 2.0 |
| Vanillin | 1.0 |
| Methyl Cinnamate | 0.5 |
| Methyl Anthranilate | 0.2 |
| Methyl Heptinyl Carbonate | 0.02 |
| Methyl Salicylate | 0.2 |
| Beta Ionone | 0.2 |
| Gamma Undecalactone | 0.2 |
| Diacetyl | 0.2 |
| Anethol | 0.07 |
| Ethyl Alcohol (95% aqueous) | 89.51 |
| 4-(2,6,6-trimethyl-1,3-cyclohexadien-1-yl)-2-butanone | 0.4 |

The 4-(2,6,6-trimethyl-1,3-cyclohexadien-1-yl)-2-butanone imparts to the above strawberry formulation a berry, seedy and woody group of notes thereby making the formulation much more natural-like.

EXAMPLE X

Strawberry Flavor Formulation

The following mixture is prepared:

| Ingredients | Parts by Weight |
| --- | --- |
| Maltol | 1.5 |
| Glacial Acetic Acid | 1.0 |
| Ethyl Methyl Phenyl Glycidate | 3.0 |
| Benzyl Acetate | 2.0 |
| Vanillin | 1.0 |
| Methyl Cinnamate | 0.5 |
| Methyl Anthranilate | 0.2 |
| Methyl Heptinyl Carbonate | 0.02 |
| Methyl Salicylate | 0.2 |
| Beta Ionone | 0.2 |
| Gamma Undecalactone | 0.2 |
| Diacetyl | 0.2 |
| Anethol | 0.07 |
| Ethyl Alcohol (95% aqueous) | 89.51 |
| 4-(6,6-dimethyl-2-methylene-3-cyclohexen-1-yl)-2-butanone | 0.4 |

The 4-(6,6-dimethyl-2-methylene-3-cyclohexen-1-yl)-2-butanone imparts to the above strawberry formulation a berry, seedy and woody group of notes thereby making the formulation much more natural-like.

EXAMPLE XI

Strawberry Flavor Formulation

The following mixture is prepared:

| Ingredients | Parts by Weight |
| --- | --- |
| Maltol | 1.5 |
| Glacial Acetic Acid | 1.0 |
| Ethyl Methyl Phenyl Glycidate | 3.0 |
| Benzyl Acetate | 2.0 |
| Vanillin | 1.0 |
| Methyl Cinnamate | 0.5 |
| Methyl Anthranilate | 0.2 |
| Methyl Heptinyl Carbonate | 0.02 |
| Methyl Salicylate | 0.2 |
| Beta Ionone | 0.2 |
| Gamma Undecalactone | 0.2 |
| Diacetyl | 0.2 |
| Anethol | 0.07 |
| Ethyl Alcohol (95% aqueous) | 89.51 |
| 90:10 weight:weight mixture of 4-(2,6,6-trimethyl-1,3-cyclohexadien-1-yl)-2-butanone and 4-(6,6-dimethyl-2-methylene-3-cyclohexen-1-yl)-2-butanone | |

The 4-(2,6,6-trimethyl-1,3-cyclohexadien-1-yl)-2-butanone and 4-(6,6-dimethyl-2-methylene-3-cyclohexen-1-yl)-2-butanone imparts to the above strawberry formulation a berry, seedy and woody group of notes thereby making the formulation much more natural-like.

EXAMPLE XII

The following mixture is prepared:

| Ingredients | Parts by Weight |
| --- | --- |
| Natural Raspberry Concentrate | 2½% |
| Water | 85% |
| Sugar syrup 37½° Baume) | 12½% |

The seedy note of this raspberry juice is imparted in increasing strength by addition of either of the following materials at the rate of from 0.02 ppm up to 1.0 ppm:

4-(2,6,6-trimethyl-1,3-cyclohexadien-1-yl)-2-butanone 4-(6,6-dimethyl-2-methylene-3-cyclohexen-1-yl)-2-butanone 90:10 weight:weight mixture of 4-(2,6,6-trimethyl-1,3-cyclohexadien-1-yl)-2-butanone and 4-(6,6-dimethyl-2-methylene-3-cyclohexen-1-yl)-2-butanone

EXAMPLE XIII

Perfume Formulation

The following mixture is prepared:

| Ingredients | Parts by Weight |
| --- | --- |
| Indol | 2.0 |
| Methyl Anthranilate | 2.0 |
| n-Heptyl Cyclopentanone | 3.0 |
| Grisalva (Produced by the 50% sulfuric acid treatment of 3-ethyl-1-(2,2,6-trimethyl-cyclo-hexen-5-yl-1)-hexen-3-ol-6) | 4.0 |
| 6,7-Dihydro-1,1,2,3,3-pentamethyl-4-(5H) indanone (Produced according to the preparation of A of Swiss Patent 523,962) | 2.0 |
| Oil of Bitter Orange | 5.0 |
| 2-Oxa-1,1,3,3-tetramethyl-2,3,5,6,7,8-hexahydro-1H-benz-(f)-indene | 5.0 |
| Terpineol Coeur | 10.0 |
| Nerolidol | 10.0 |
| 2-t-butyl-cyclohexanyl acetate | 20.0 |
| Linalyl Acetate | 90.0 |
| Linalool | 110.0 |
| 4-(4-methyl-4-hydroxyamyl)-Δ³-cyclo-hexene-carboxaldehyde | 20.0 |
| Benzyl Alcohol | 90.0 |
| Benzyl Acetate | 150.0 |
| 4-(2,6,6-trimethyl-1,3-cyclohexadien-1-yl)-2-butanone | 3.0 |

The 4-(2,6,6-trimethyl-1,3-cyclohexadien-1-yl)-2-butanone imparts to the above floral type formulation, a sweet, raspberry, "mimosa" note.

EXAMPLE XIV

Perfume Formulation

The following mixture is prepared:

| Ingredients | Parts by Weight |
| --- | --- |
| Indol | 2.0 |
| Methyl Anthranilate | 2.0 |
| n-Heptyl Cyclopentanone | 3.0 |
| Grisalva (Produced by the 50% sulfuric acid treatment of 3-ethyl-1-(2,2,6-trimethyl-cyclo-hexen-5-yl-1)-hexen-3-ol-6) | 4.0 |
| 6,7-Dihydro-1,1,2,3,3-pentamethyl-4-(5H)-indanone (Produced according to the preparation of A of Swiss Patent 523,962) | 2.0 |
| Oil of Bitter Orange | 5.0 |
| 2-Oxa-1,1,3,3-tetramethyl-2,3,5,6,7,8-hexahydro-1H-benz-(f)-indene | 5.0 |
| Terpineol Coeur | 10.0 |
| Nerolidol | 10.0 |
| 2-t-butyl-cyclohexanyl acetate | 20.0 |
| Linalyl Acetate | 90.0 |
| Linalool | 110.0 |
| 4-(4-methyl-4-hydroxyamyl-Δ³-cyclo-hexene-carboxaldehyde | 20.0 |
| Benzyl Alcohol | 90.0 |
| Benzyl Acetate | 150.0 |
| 4-(6,6-dimethyl-2-methylene-3-cyclo-hexen-1-yl)-2-butanone | 3.0 |

The 4-(6,6-dimethyl-2-methylene-3-cyclohexen-1-yl)-2-butanone imparts to the above floral type formulation, a sweet, raspberry, "mimosa" note.

EXAMPLE XV

Perfume Formulation

The following mixture is prepared:

| Ingredients | Parts by Weight |
| --- | --- |
| Indol | 2.0 |
| Methyl Anthranilate | 2.0 |
| n-Heptyl Cyclopentanone | 3.0 |
| Grisalva (Produced by the 50% sulfuric acid treatment of 3-ethyl-1-(2,2,6-trimethyl-cyclo-hexen-5-yl-1)-hexen-3-ol-6) | 4.0 |
| 6,7-Dihydro-1,1,2,3,3-pentamethyl-4-(5H) indanone (Produced according to the preparation of A of Swiss Patent 523,962) | 2.0 |
| Oil of Bitter Orange | 5.0 |
| 2-Oxa-1,1,3,3-tetramethyl-2,3,5,6,7,8-hexahydro-1H-benz-(f)-indene | 5.0 |
| Terpineol Coeur | 10.0 |
| Nerolidol | 10.0 |
| 2-t-butyl-cyclohexanyl acetate | 20.0 |
| Linalyl Acetate | 90.0 |
| Linalool | 110.0 |
| 4-(4-methyl-4-hydroxyamyl)-Δ³-cyclo-hexene-carboxaldehyde | 20.0 |
| Benzyl Alcohol | 90.0 |
| Benzyl Acetate | 150.0 |

90:10 weight:weight mixture of 4-(2,6,6-trimethyl-1,3-cyclohexadien-1-yl)-2-butanone and 4-(6,6-dimethyl-2-methylene-3-cyclohexen-1-yl)-2-butanone The 4-(2,6,6-trimethyl-1,3-cyclohexadien-1-yl)-2-butanone and 4-(6,6-dimethyl-2-methylene-3-cyclohexen-1-yl)-2-butanone imparts to the above floral type formulation, a sweet, raspberry, "mimosa" note.

EXAMPLE XVI

Preparation of Mixture of 4-(2,6,6-Trimethyl-1,3-Cyclohexadien-1-yl)-2-Butanone and 4-(6,6-Dimethyl-2-Methylene-3-Cyclohexen-1-yl)-2-Butanone Into a 50 ml three-neck flask equipped with reflux condenser, thermometer, magnetic stirrer, addition funnel and nitrogen purge, the following materials are needed:

| Ingredients | Parts by Weight |
| --- | --- |
| Alpha-Dihydro Ionone having the structure: | 9.6 grams |

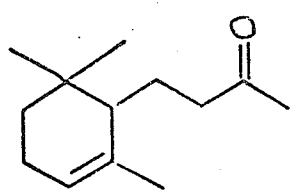

| | |
| --- | --- |
| Quinoline | 3.2 grams |
| Chloroform | 25 ml |

The resulting mixture is cooled in an ice-sodium chloride bath and a mixture of 3.2 grams of bromine and 9 ml chloroform is added drop-wise with stirring over a half hour period. The reaction mass is then stirred at 5°C for a period of 5 hours and then concentrated under reduced pressure. The resulting residue is then heated on a steam bath for a period of 3 hours after 11 ml of N,N-Diethylaniline has been added to the residue. After 3 hours 2.5 ml pyridine is then added to the reaction mass and heating is continued for a ½ hour longer. To the cooled reaction mixture are added 50 ml of 5 N Hydrochloric acid. The aqueous layer is then extracted with three 100 ml portions of n-pentane. The combined pentane extracts are washed with two 50 ml portions of 5 N hydrochloric acid, then two 50 ml 10% sodium bicarbonate solution portions and two 100 ml portions of distilled water. The pentane extracts are then evaporated after drying over anhydrous sodium sulfate yielding (confirmed by infrared and mass spectral analysis) a mixture containing 90% 4-(2,6,6-trimethyl-1,3-cyclohexadien-1-yl)-2-butanone and 10% 4-(6,6-dimethyl-2-methylene-3-cyclohexen-1-yl)-2-butanone (over-all yield: 8.8%). The 90:10 mixture of 4-(2,6,6-trimethyl-1,3-cyclohexadien-1-yl)-2-butanone and 4-(6,6-dimethyl-2-methylene-3-cyclohexen-1-yl)-2-butanone distills at 65°C and at 15 mm Hg. pressure.

EXAMPLE XVII

Tobacco Use

The following tobacco flavor formulation (A) is prepared:

| Ingredients | Parts by Weight |
| --- | --- |
| Ethyl Butyrate | .05 |
| Ethyl Valerate | .05 |
| Maltol | 2.00 |
| Cocoa Extract | 26.00 |
| Coffee Extract | 10.00 |
| EtOH | 20.00 |
| Water | 41.90 |

A tobacco formulation (B) is prepared as follows:

| Ingredients | Parts by Weight |
| --- | --- |
| Bright | 40.1 |
| Burley | 24.9 |
| Maryland | 1.1 |
| Turkish | 11.6 |
| Stem (flue-cured) | 14.2 |
| Glycerine | 2.8 |
| Water | 5.3 |

The flavor formulation (A) is added to a portion $B_1$ of the smoking tobacco formulation at the rate of 0.1% by weight of the tobacco. The flavored and non-flavored tobacco formulations are then formulated into cigarettes by the usual manufacturing procedures:

i. At the rate of 20 ppm to one quarter of the cigarettes in each group is added 4-(2,6,6-trimethyl-1,3-cyclohexadien-1-yl)-2-butanone or 4-(6,6-dimethyl-2-methylene-3-cyclohexen-1-yl)-2-butanone. The use of the 4-(2,6,6-trimethyl-1,3-cyclohexadien-1-yl)-2-butanone or 4-(6,6-dimethyl-2-methylene-3-cyclohexen-1-yl)-2-butanone enhances the natural character causing the tobacco to be less harsh, more aromatic and to have a very natural-like sweet taste and aroma on smoking whether or not the other flavor ingredients of Formulation (A) are present.

ii. At the rate of 40 ppm to one quarter of the cigarettes in each group is added 4-(2,6,6-trimethyl-1,3-cyclohexadien-1-yl)-2-butanone or 4-(6,6-dimethyl-2-methylene-3-cyclohexen-1-yl)-2-butanone. The use of the 4-(2,6,6-trimethyl-1,3-cyclohexadien-1-yl)-2-butanone or 4-(6,6-dimethyl-2-methylene-3-cyclohexen-1-yl)-2-butanone at this level also causes the tobacco to have a distinct and natural sweet flavor and aroma; much more natural and sweet and less harsh in the smoke with more body than the same formulation without the 4-(2,6,6-trimethyl-1,3-cyclohexadien-1-yl)-2-butanone or 4-(6,6-dimethyl-2-methylene-3-cyclohexen-1-yl)-2-butanone prior to smoking and on smoking, whether or not other flavoring ingredients of Formulation (A) are present therein.

What is claimed is:

1. A process for enhancing the red-berry flavor of a foodstuff comprising adding thereto from 0.02 ppm up to 50 ppm by weight based on the total weight of foodstuff of a mixture of 4-(2,6,6-trimethyl-1,3-cyclohexadien-1-yl)-2-butanone and 4-(6,6-dimethyl-2-methylene-3-cyclohexen-1-yl)-2-butanone, the weight ratio of 4-(2,6,6-trimethyl-1,3-cyclohexadien-1-yl)-2-butanone:4-(6,6-dimethyl-2-methylene-3-cyclohexen-1-yl)-2-butanone being 90:10.

* * * * *